(12) United States Patent
Kroczek et al.

(10) Patent No.: US 11,796,079 B2
(45) Date of Patent: Oct. 24, 2023

(54) VALVE ASSEMBLY

(71) Applicant: Goodrich Corporation, Charlotte, NC (US)

(72) Inventors: Piotr Kroczek, Lubsza (PL); Dariusz Sapija, Kiełczówek (PL); Łukasz Turek, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/852,638

(22) Filed: Jun. 29, 2022

(65) Prior Publication Data
US 2023/0011853 A1    Jan. 12, 2023

(30) Foreign Application Priority Data
Jul. 7, 2021   (EP) ..................................... 21461565

(51) Int. Cl.
| F16K 31/04 | (2006.01) |
| F16K 11/087 | (2006.01) |
| F16K 5/06 | (2006.01) |

(52) U.S. Cl.
CPC .......... F16K 31/041 (2013.01); F16K 5/0605 (2013.01); F16K 11/0873 (2013.01)

(58) Field of Classification Search
CPC ............... F16K 31/041; F16K 11/0873; F16K 2200/202; F16K 5/10; F16K 5/0605; Y10T 137/8803
See application file for complete search history.

(56) References Cited

U.S. PATENT DOCUMENTS

| 2,769,456 A * | 11/1956 | Atkinson .................. F16K 5/00 |
| | | 137/637.5 |
| 8,839,817 B2 * | 9/2014 | Dederich .............. F16K 5/0442 |
| | | 251/249.5 |
| 2021/0047959 A1 | 2/2021 | Jafari et al. |

FOREIGN PATENT DOCUMENTS

| JP | S58174766 A | 10/1983 |
| WO | 2015072915 A1 | 5/2015 |
| WO | 2017217112 A1 | 12/2017 |

OTHER PUBLICATIONS

Abstract of JPS58174766; Published Oct. 13, 1983, 1 page.
European Search Report for Application No. 21461565.0, dated Jan. 5, 2022, 49 pages.

* cited by examiner

Primary Examiner — Michael R Reid
(74) Attorney, Agent, or Firm — CANTOR COLBURN LLP

(57) ABSTRACT

A multi-way valve assembly includes a valve housing having a plurality of fluid ports, a first valve member having one or more first flow channels defined therethrough and a first shaft, rotation of which causes rotation of the first valve member relative to the housing, the first valve member defining a cavity, and a second valve member arranged within the cavity of the first valve member and having one or more second flow channels defined therethrough and a second shaft. Rotation of the second shaft causes rotation of the second valve member relative to the housing. The assembly also includes a locking mechanism configured to, in a locked position, cause the second valve member to rotate with the first valve member relative to the housing and, in an unlocked position, to permit the second valve member to rotate relative to the first valve member and the housing.

13 Claims, 11 Drawing Sheets

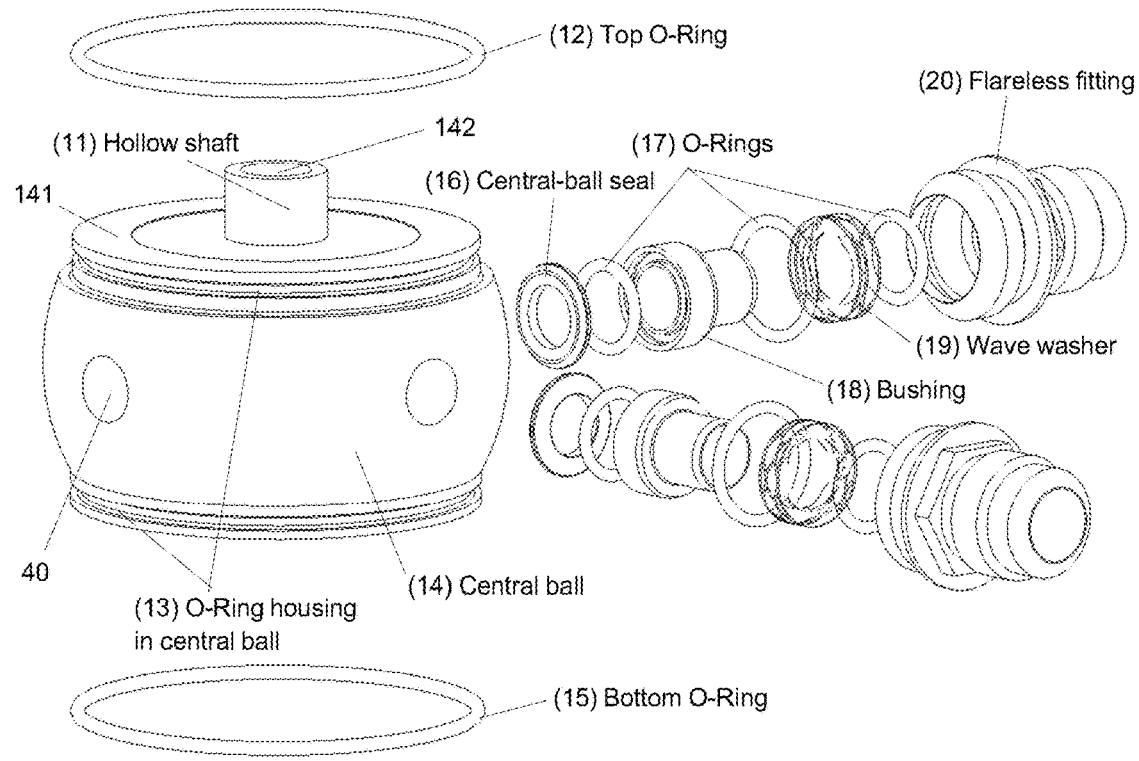
FIG. 4
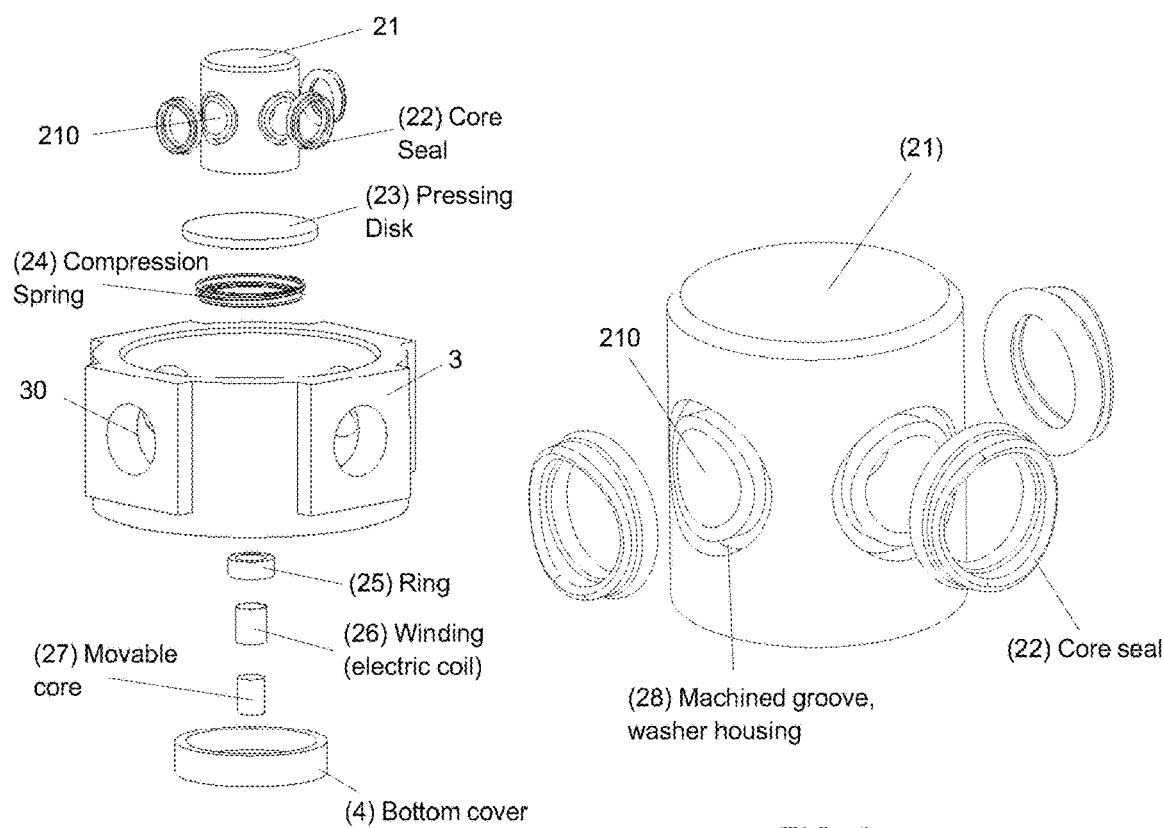
FIG. 5
FIG. 6

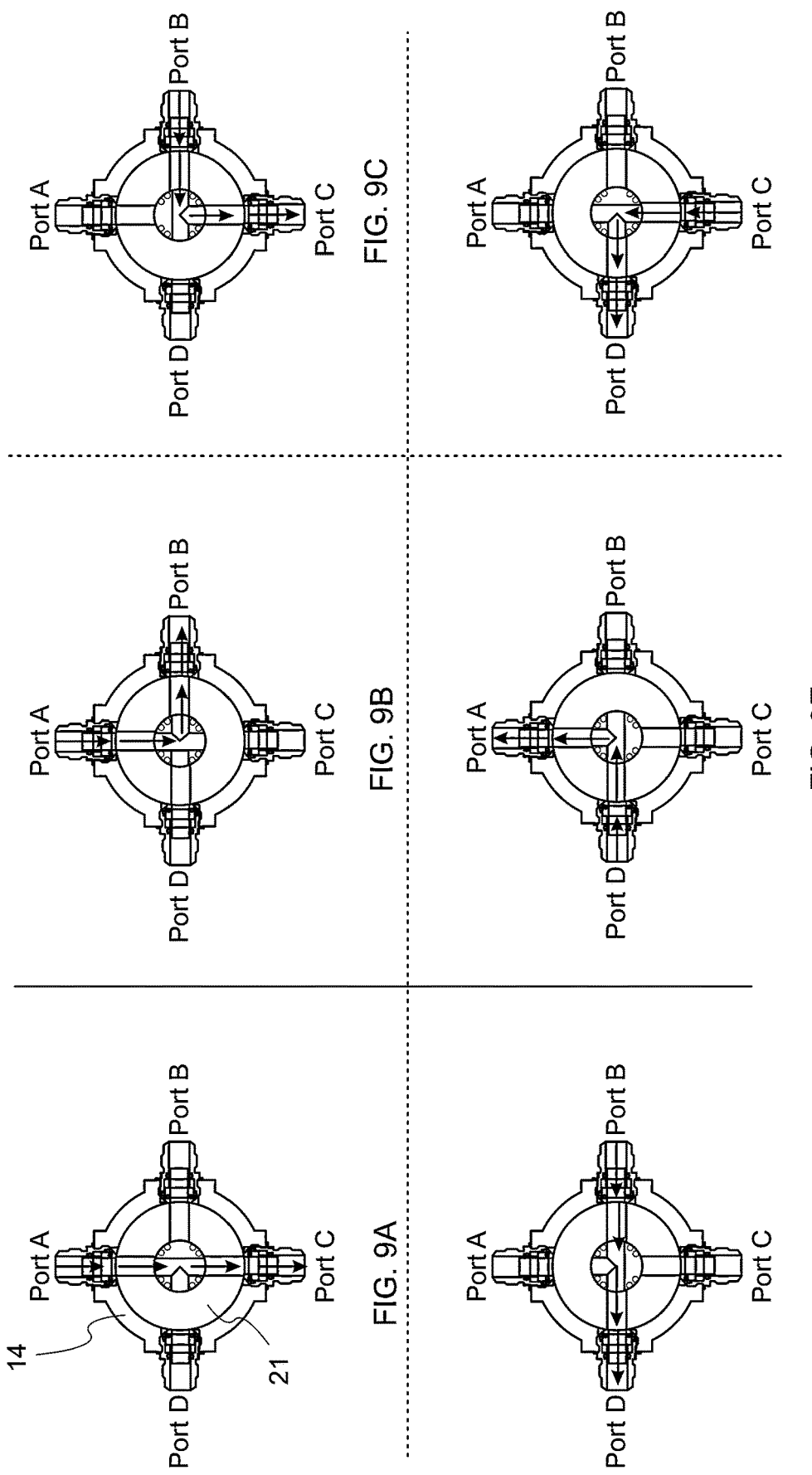

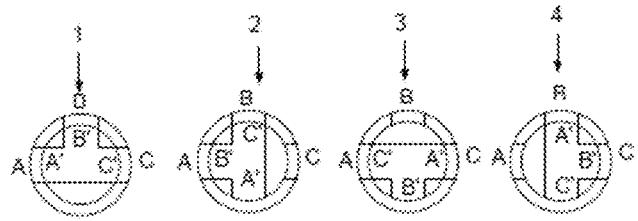
FIG. 11A
FIG. 11B
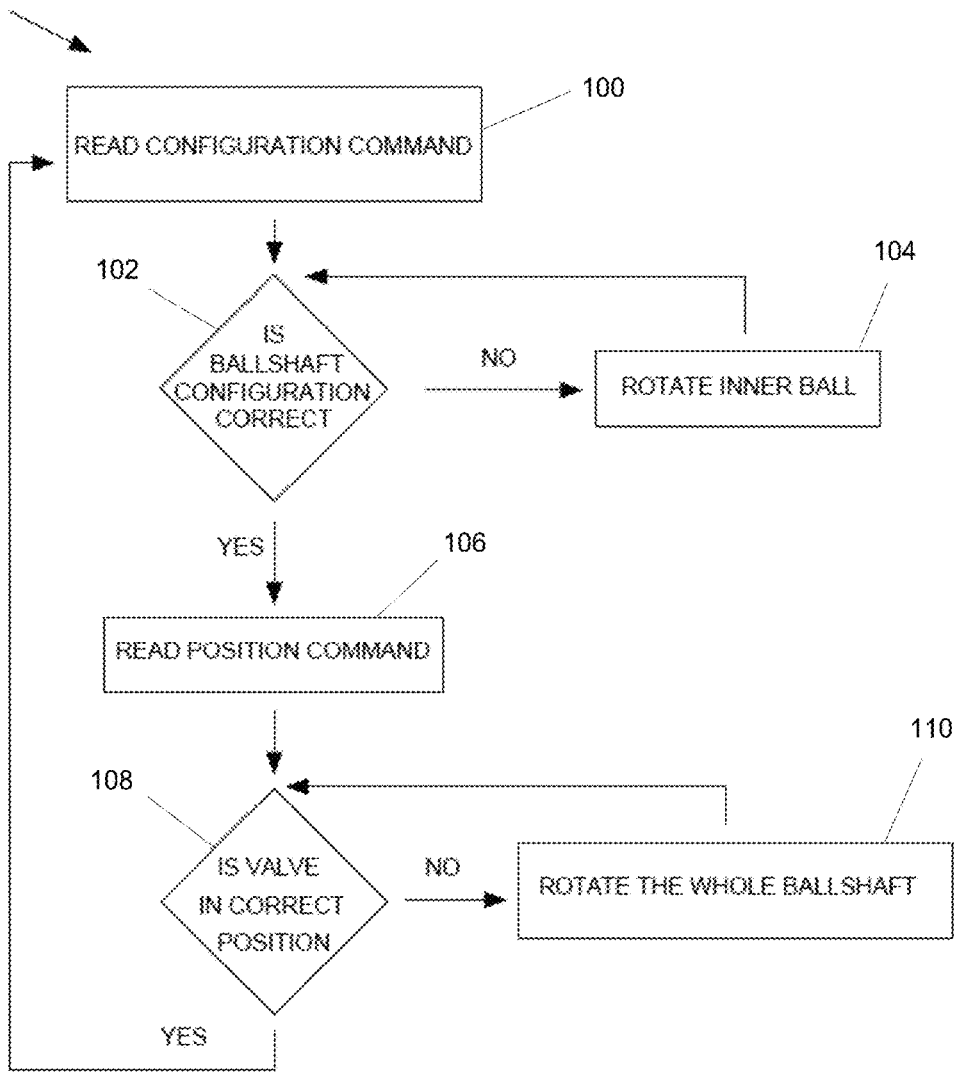
FIG. 12

VALVE ASSEMBLY

CROSS REFERENCE TO RELATED APPLICATIONS

This application claims priority to European Patent Application No. 21461565.0 filed Jul. 7, 2021, the entire contents of which is incorporated herein by reference.

TECHNICAL FIELD

The present disclosure is concerned with valve assemblies for regulating fluid flow through a fluid system.

BACKGROUND

Valves are used in many applications to control the flow of fluid. Valves can be used to stop fluid flow or to reduce/increase and/or divert fluid flow. Valves can be manually operated and/or automatically operated e.g. motorised. For example, a valve may be provided between a source of fluid e.g. water and a reservoir such as a water tank e.g. for use in a water closet, a wash basin, a drinks machine etc. The valve can be opened to fill the reservoir from the source and then closed when the reservoir is sufficiently full. One type of valve is a ball valve or ball shaft wherein a rotatable ball element is mounted within a conduit providing the fluid flow path. The ball element has a passage or channel therethrough. The ball is mounted on a shaft that is rotated, in the case of manual operation, by means of a handle attached to the shaft or, in the case of a motor driven valve, by means of a motor. Rotation of the shaft causes rotation of the ball element and thus the channel relative to the flow path through the conduit. Thus, the valve is rotated, either manually by means of a handle or automatically, by means of a motor, between an open position in which the channel through the ball is aligned with the flow path to allow flow of fluid through the passage, and a closed position in which the passage is not aligned with the flow path and, instead, the body of the ball element closes off the flow path and fluid is unable to flow past the ball element.

Some valves are two-way valves i.e. include a single channel with two ends, each of which cooperates with a port and a conduit of the system when in the open position and, when in the closed position, the channel ends do not align with the ports and conduits and so the body of the valve blocks flow of the fluid through the valve.

Other valves may be three-way valves having a channel configuration such as a T- or L-shaped channel defining three inlets/outlets for alignment with three ports and fluid conduits by a quarter turn of the valve. Such valves may be used e.g. to divert a portion of the fluid flow from the main flow channel.

A system designer will need to select and install the correct type of valve for the particular system and application and will select from available two-way and three way valves when designing the system. If a system requires both types of valves, multiple valves will be installed.

Whilst such valve flow design is well-known, it does not offer flexibility in e.g. adding additional fluid supplies or applications after the valves have been selected and installed into the system, Furthermore, the use of multiple valves adds to the overall size, weight and cost of a system. This may be undesirable especially in applications where weight and/or size should be kept to a minimum e.g. in aircraft.

There is, therefore a need for a simple, low cost, small and low weight valve assembly that can provide design flexibility.

SUMMARY

According to the disclosure, there is provided a multi-way valve assembly comprising: a valve housing having a plurality of fluid ports; a first valve member having one or more first flow channels defined therethrough and a first shaft, rotation of which causes rotation of the first valve member relative to the housing, the first valve member defining a cavity; a second valve member arranged within the cavity of the first valve member and having one or more second flow channels defined therethrough and a second shaft, rotation of which causes rotation of the second valve member relative to the housing; and a locking mechanism configured to, in a locked position, cause the second valve member to rotate with the first valve member relative to the housing and, in an unlocked position, to permit the second valve member to rotate relative to the first valve member and the housing

BRIEF DESCRIPTION

Examples of the valve assembly according to the disclosure will now be described by way of example only with reference to the drawings.

FIG. 4 is an exploded view of a part of a valve assembly according to the disclosure.

FIG. 5 is an exploded view of another part of a valve assembly according to the disclosure.

FIG. 6 is an exploded view of another part of a valve assembly according to the disclosure.

FIGS. 9A to 9F show possible positions of the assembly operating as a two-way valve.

FIG. 11A shows possible valve configurations in matrix form.

FIG. 11B shows possible configurations in schematic view, corresponding to the matrix configurations of FIG. 11A.

FIG. 12 is a flow chart of one control method for the valve assembly.

DETAILED DESCRIPTION

Figure 1A:
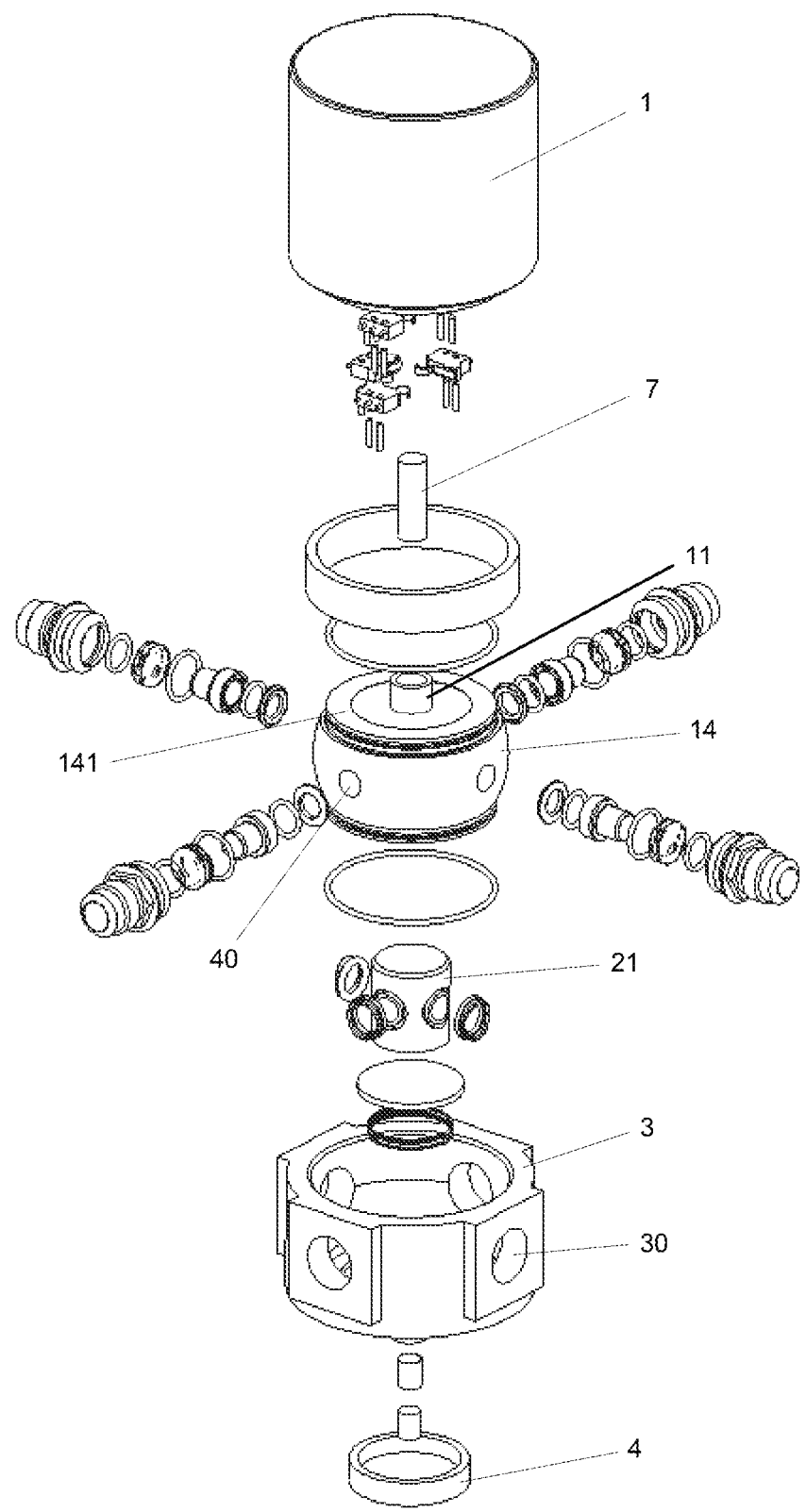
FIG. 1A is an exploded top view of a valve assembly according to the disclosure.

The valve assembly of the present disclosure includes two relatively rotatable valve elements configured such that a number of different flow paths can be created through the valve, allowing the assembly to selectively operate as a two-way or a three-way valve. The assembly allows more fluid conduits to be connected to the valve as desired. For example, in a water system, the single valve assembly can be configured to be connected to multiple water tanks or reservoirs.

The assembly, will be described in more detail below with reference to specific examples, as shown in the drawings.

Figure 2:
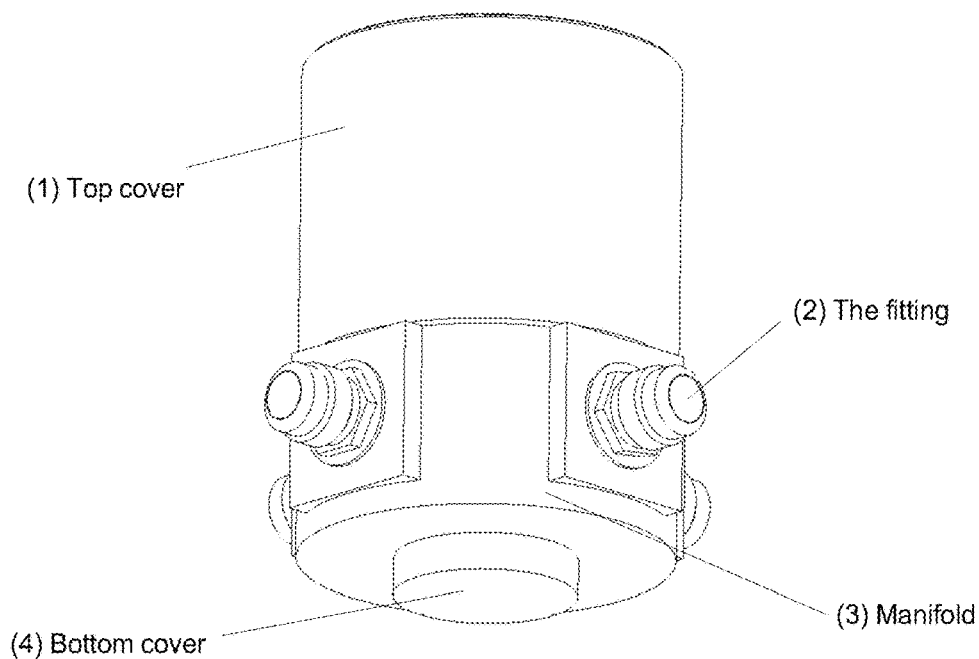
FIG. 2 is a perspective view of the exterior of an assembly according to the disclosure.

Referring first to FIG. 2, the valve assembly is provided in a housing comprising a top cover 1, a manifold 3 for attachment to the fluid flow conduits of the fluid system, and a bottom cover 4. The valve components are provided inside the housing as will be described further below whereby the valve elements are arranged inside the manifold 3 such that conduits of other parts of the system can be connected in fluid flow connection with the flow channels of the valve elements via fittings 2 through openings 30 in the manifold 3. The fittings 2 may be fitted to the manifold by cooperating threads in the openings 30 and on the fittings 2. In this example, the manifold is provided with four openings and four fittings for connection to four different fluid flow conduits of the system. Examples may be envisaged with different numbers of openings and fittings according to system design and requirements.

Figure 1B:
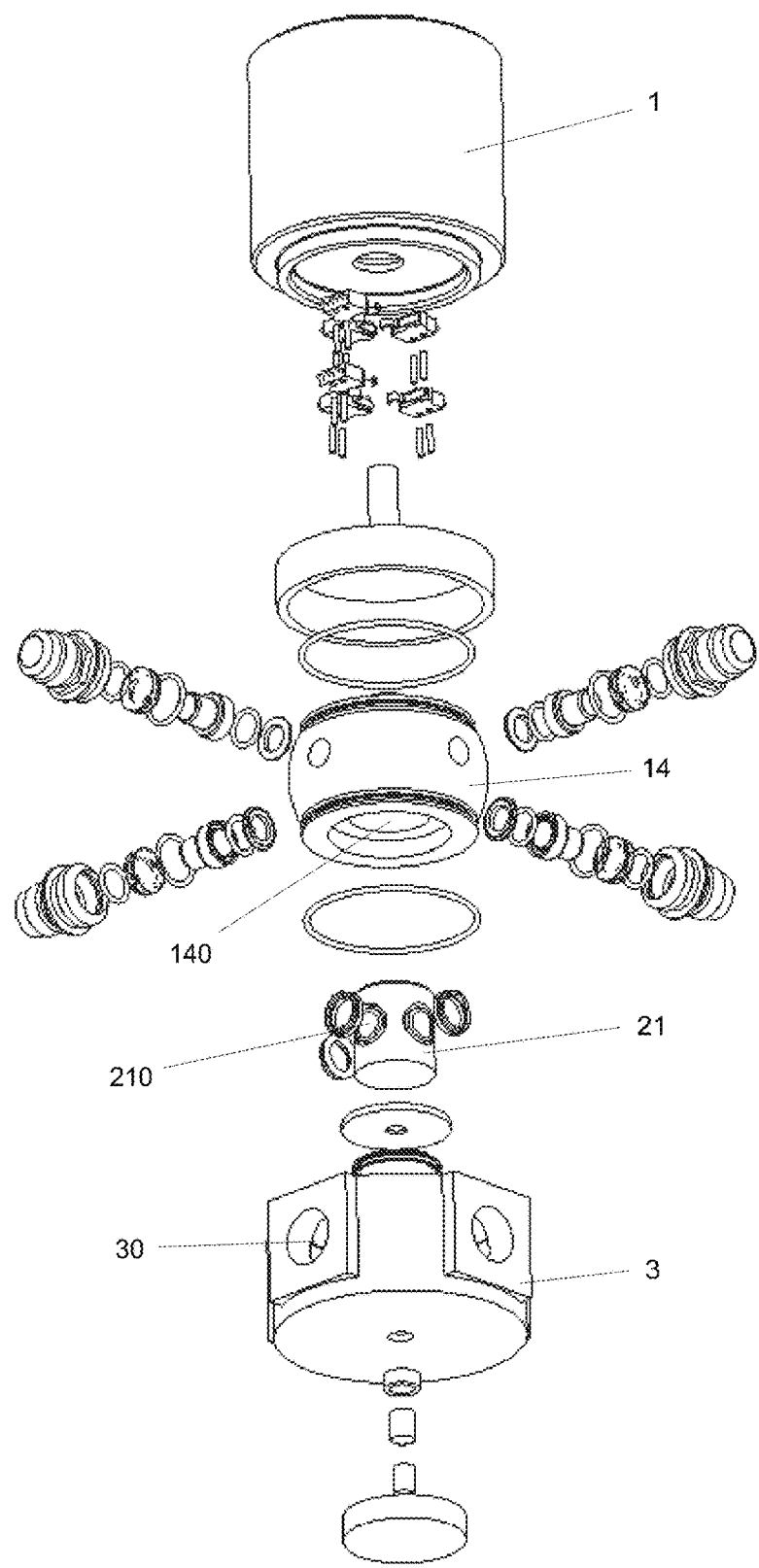
FIG. 1B is an exploded bottom view of a valve assembly according to the disclosure.

The main features of the valve assembly, best seen in FIGS. 1A and 1B, will be briefly described first, and the individual parts are then shown and described in more detail with reference to the other drawings.

The valve assembly comprises two valve elements, namely a main ball element 14 rotatably mounted within the manifold 3 and a core valve element 21 rotatably mounted within the main ball element 14. The main ball element 14 is provided with flow channels through its walls, each channel defined from an outer opening 40 to an inner opening. In the example, the main ball shaft has four outer openings 40 spaced around its outer circumference. The outer openings 40 are arranged such that they are in fluid flow communication with the openings 30 of the manifold 3, and hence the fittings 4 and the system fluid flow conduits, at a given rotational position of the main ball element with respect to the manifold. A first shaft 11 is provided to rotate with the main ball element 14. The first shaft extends from the main ball element into the top cover 1.

The main ball element 14 defines an interior space 140 and, in the example shown, the interior space is closed by a cover 141 from which the first shaft 11 extends.

Located within the interior space, and arranged to rotate relative to the main ball element 14 is a second valve element 21. A second shaft 7 extends from, and rotates with the second valve element and, in the example shown, the second shaft 7 extends through the first shaft (the first shaft 11 being hollow) into the top cover 1. The second valve element 21 is also provided with openings 210 that lead into channels through the second valve element and can align with ones or combinations of the openings 40 in the main ball element 14 depending on the relative rotational positions of the second valve element 21 and the main ball element 14. Various seals are provided as will be described further below.

Figure 3:
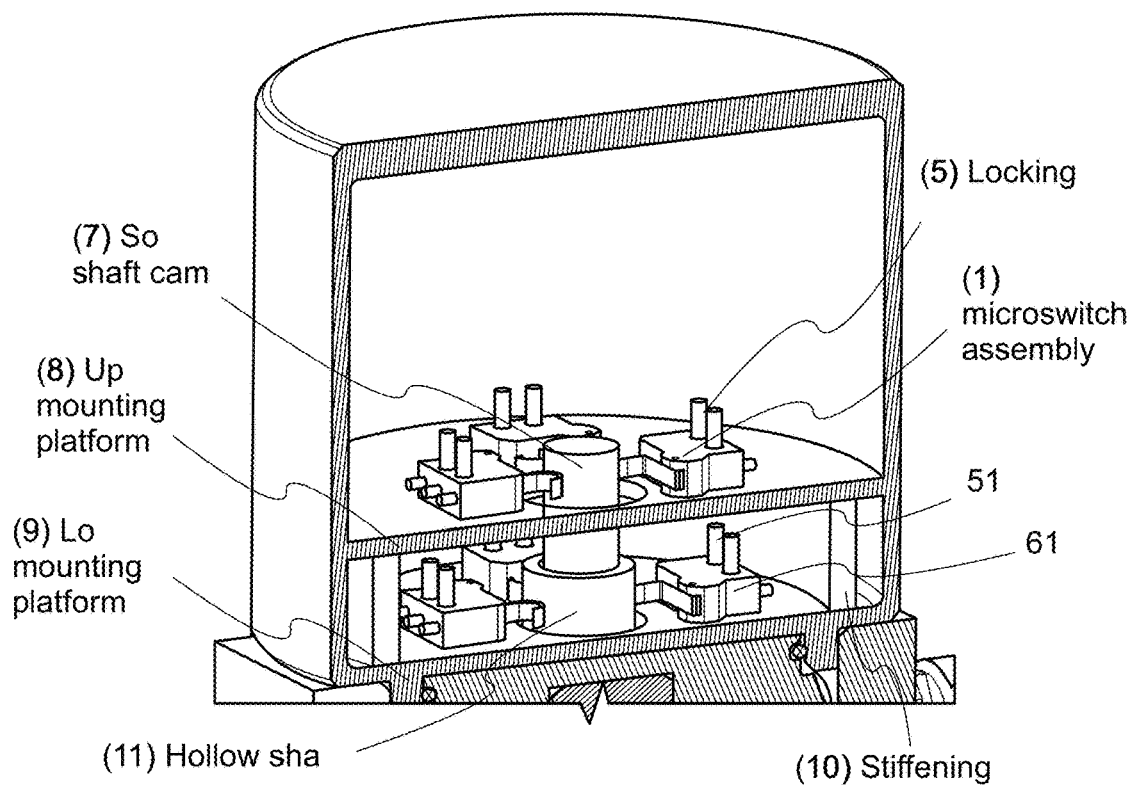
FIG. 3 is a sectional view of the assembly of FIG. 2.
Figure 7A:
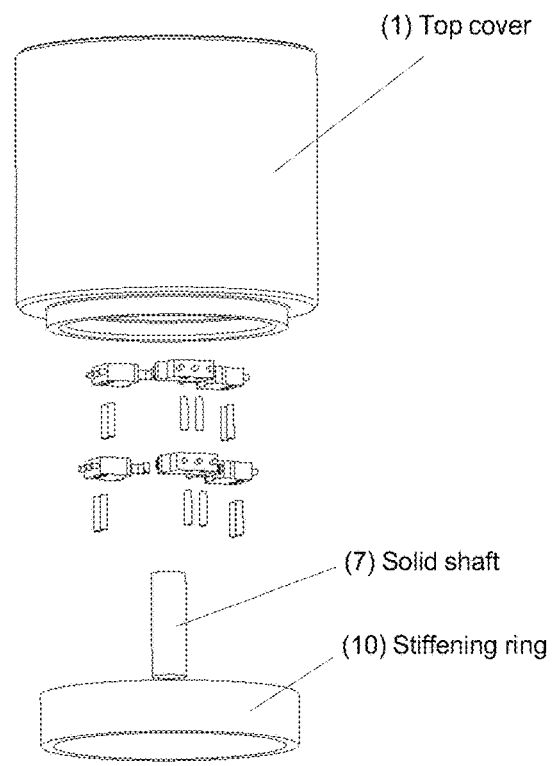
FIG. 7A is an exploded view of a microswitch arrangement of a valve assembly according to the disclosure.
Figure 7B:
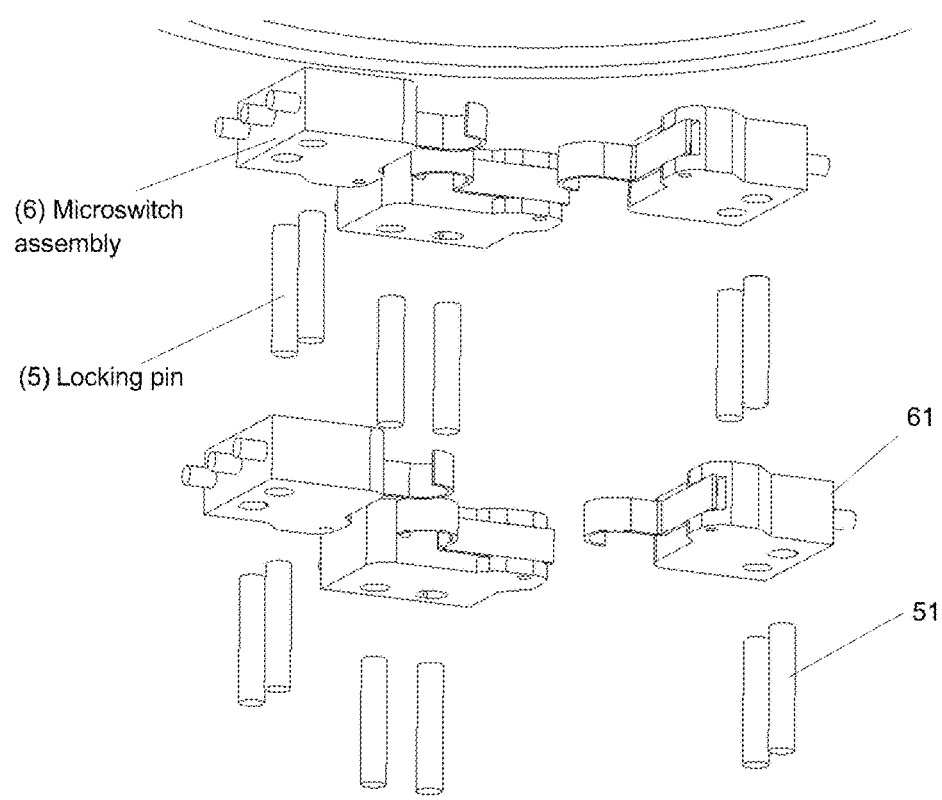
FIG. 7B is a more detailed view of the microswitches shown in FIG. 7A.

In the example, the valve arrangement is also provided with two sets of microswitches to detect the rotational positions of the main ball element 14 and the second valve element 21, as will be described further below. An example of the microswitch features can be seen in FIG. 3. A first set of microswitches (at least three microswitches in the set) is arranged to detect rotational position of one of the first and second shafts 11, 7 and, thus, of the valve element (and its ports or openings) associated with that shaft, and a second set of microswitches is arranged to detect rotational position of the other of the first and second shafts and its associated valve element and ports/openings. In the example shown, the first shaft 11, that rotates with the main ball element 14 forms a hollow outer shaft and the second shaft 7, arranged to rotate with the second valve element 21, is a solid (or hollow) shaft that extends through, and beyond, the first shaft 11 extending further into the top cover 1 than the first shaft. This allows rotational position of the two shafts (and hence the two valve elements 14, 21) to be detected by two different microswitch assemblies positioned at different axial locations within the top cover 1. A lower set of microswitches 61 is arranged (here on a lower platform 9 within the top cover 1, secured by locking pins 51) proximate the part of the first shaft 11 extending into the top cover 1 to detect rotational position of that shaft, and an upper set of microswitches 6 is arranged (here on an upper platform 8 within the top cover 1, secured by locking pins 5) proximate the part of the second shaft 7 that protrudes from the first shaft 11 to detect rotational position of the second shaft 7. The two mounting platforms 8, 9 may be held at an axial distance from each other in the top cover by means of a reinforcing ring 10. Other examples can be envisaged in which the first and second shafts are interchanged and/or that the sets of microswitches are mounted in different ways to be proximate the respective shafts. The microswitches detect rotational position of the shafts in a known manner by opening/closing a circuit dependent on the relative position of a cam formed on the respective shaft and contact between the cam and the switches. The switch assemblies are shown in more detail in FIGS. 7A and 7B. The actual operation of the cam switches, though, is a known technique and will not be described further here. Using the two sets of microswitches, the respective positions of the two valve elements can be determined and also controlled as required to direct the fluid flow in different directions and flow paths through the valve assembly.

As briefly described above, the integral assembly of two independent valve elements 14, 21, that are able to rotate relative to each other or with each other, and relative to the manifold ports, allows a variety of different flow paths to be provided through the valve assembly. It is envisaged that the relative positions of the valve elements could be set before installation of the valve assembly into the system, according to system requirements or, alternatively, that the valve assembly can be installed such that the relative positions of the valve elements can be controlled after installation, during use.

FIG. 4 shows, in greater detail, an example of a main ball element 14 as the first valve element. The ball element 14 has a circular cylindrical body through which channels are formed from openings 40 in the body. The body is annular and defines an interior space that is not seen in FIG. 4. This is closed by a cover 141. A first shaft 11 is an integral part of the cover 141 and extends from the ball element 14. Here, the first shaft is hollow, defining a passage 142 through which the second shaft can extend as described further below.

The main ball element 14 is fitted inside the manifold 3 and O-ring seals 12, 15 are located in grooves 13 in the ball element body to seal the element inside the manifold 3. The ball element 14 is assembled such as to be able to rotate relative to the manifold. FIG. 4 also shows the fittings 2 that connect the openings or ports 30 of the manifold 3 to conduits in the systems from which fluid flows to the valve or to which fluid flows from the valve. The fittings include a connector piece 20, and may include various seals (16, 17) and washers (19) and bushings (18) and end with a seal for providing fluid tight engagement with the openings 40 of the ball element 14, via the manifold openings 30, when the ball element 14 is assembled inside the manifold 3 and rotated to a position where the ball element openings 14 align with the manifold openings/ports 30. In this aligned position, fluid in the system can flow through the valve assembly via the main ball element.

FIG. 5 shows more details of the second valve element 21 that, in use, is assembled in the interior space of the main ball element 14 (the ball element is not shown in FIG. 5 to aid in explaining the structure of the second valve element). The second valve element comprises a core having three ports 210 leading to flow channels through the core. The core is arranged to rotate within and relative to the ball element 14 such that the alignment of the ports or openings 210 and the openings/ports of the ball element depends on the relative rotational positions of the valve elements. Seals 22 are provided and may be fitted into grooves 28 formed around the openings 210.

The relative axial position of the second valve element 21 with respect to the body of the ball element 14 is controlled in this example by means of a compression spring 24 and a pressing disk 23 compressed between the second valve element core and the bottom cover 4 of the assembly.

Means are provided to allow rotation of the second valve element 21 relative to the first valve element. In one example, this is by means of a solenoid 26, 27 comprising an electric winding 26 and a core 27. A ring 25 may be provided to maintain coaxiality of the solenoid parts 26, 27. Other brake or locking mechanisms may also be used.

Figure 8A:
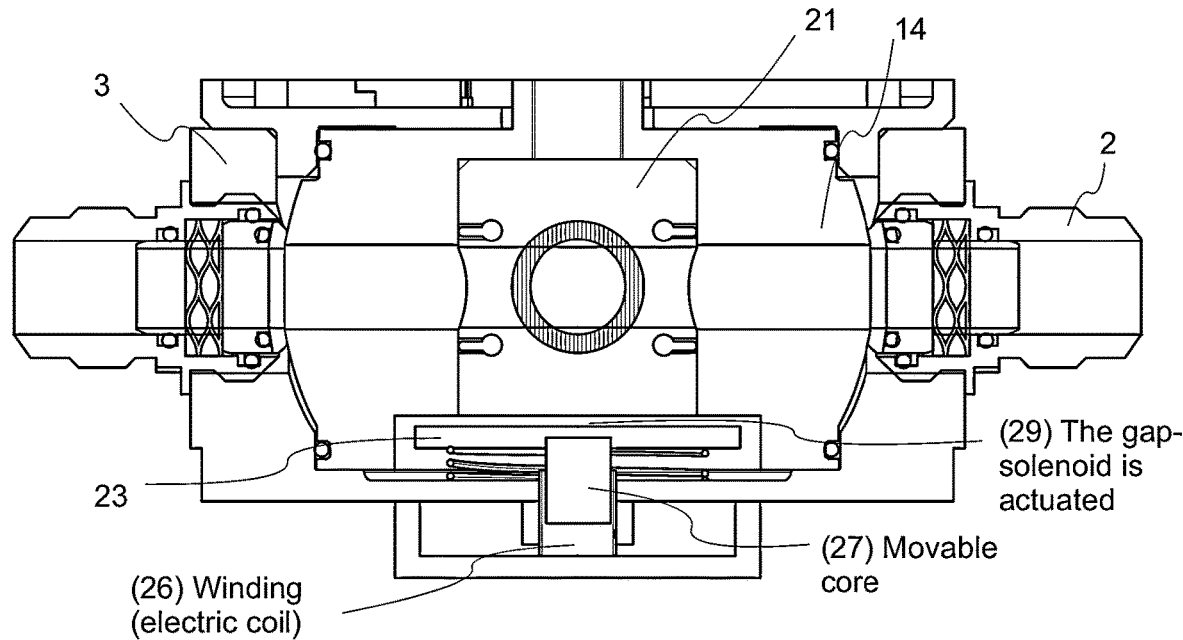
FIG. 8A is a sectional view through a valve assembly according to the disclosure in a first state once the solenoid is activated.
Figure 8B:
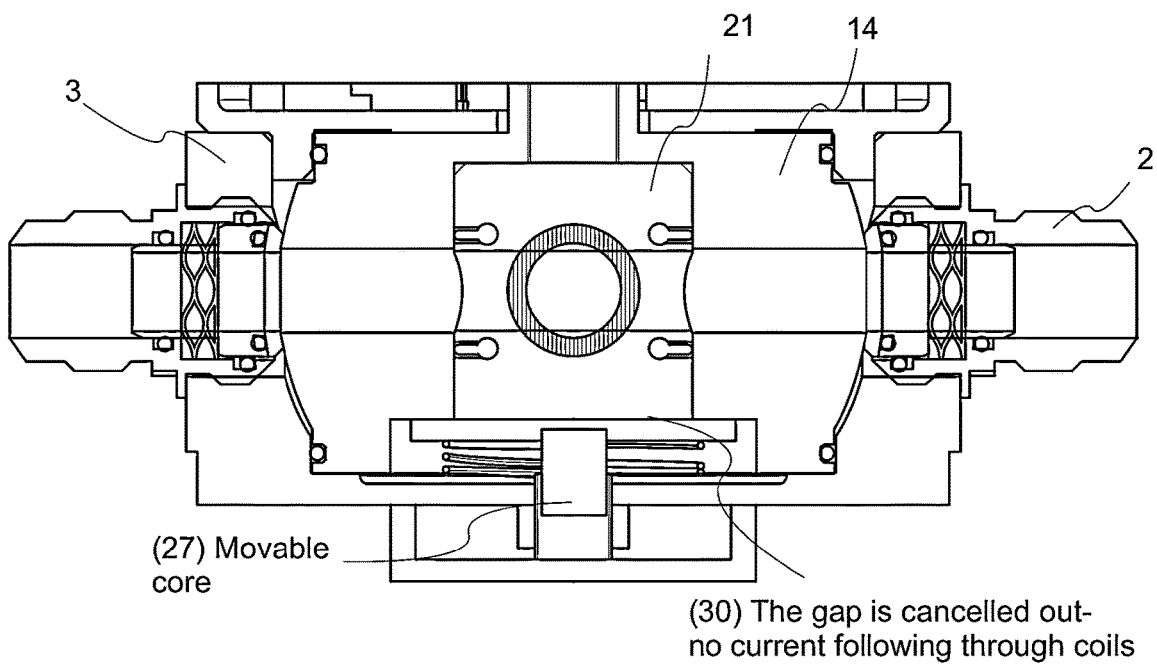
FIG. 8B is a sectional view through a valve assembly according to the disclosure in a second state once the solenoid is deactivated.

Operation of the valve will now be described in more detail with reference to FIGS. 8 to 10. FIGS. 8A and 8A show how the two valve elements 14, 21 are either locked against relative rotation or permitted to rotate relative to each other. In the example shown, this function is provided by the solenoid as described below.

The solenoid, which comprises an electric coil 26 around a ferromagnetic core 27, is activated when current is applied to the coil. As current flows through the coil, a magnetic field is created around the coil, the strength of which depends on the current, the number of windings and the core material. As a result of the magnetic field, the core 27 is pulled towards the centre of the coil 26 and remains in that position so long as current is flowing through the coil. This creates a gap 29 while the solenoid is activated between the pressing disk 23 and the core 21 and also between the pressing disk and the ball element 14 (FIG. 8A). This means that both valve elements 14, 21 are free to rotate about their axes relative to each other. If current stops, the solenoid is deactivated. The magnetic field disappears and the force of the compression spring 24 forces the solenoid core 27 and, consequently the pressure disk 23 into engagement with the valve elements 14, 21. The frictional force prevents the valve elements from rotating relative to each other. Thus, when the valve elements are locked together e.g. by deactivation of the solenoid, the assembly acts as a single valve. If, however, the valve elements are unlocked from each other, further flow channel configurations are possible.

FIGS. 9A to 9F show possible configurations and flow paths through the valve assembly when the valve is operating as a two-way valve, with the arrows showing the direction of fluid flow for different positions of the second valve element 21 relative to the main ball element 14. In the position shown in FIG. 9A the ball element 14 is aligned with the manifold ports such that fluid enters the ball element at port A and port C of the ball element is connected to the other line or the system. The second valve element 21 is rotated relative to the ball element such that its opposing ports are aligned with port A and C respectively and fluid flows from port A directly through the valve to port C. In FIG. 9B, the ball element is connected to fluid lines of the system at ports A and B and the second valve element is rotated by 90 degrees relative to FIG. 9A such that a fluid flow path is formed between port A and port B. In the arrangement of FIG. 9C, the two elements are configured to provide flow from port B to port C. In the arrangement of FIG. 9D, the two elements are configured to provide flow from port B to port D. In the arrangement of FIG. 9E, the two elements are configured to provide flow from port D to port A. In the arrangement of FIG. 9F, the two elements are configured to provide flow from port C to port D. In each configuration, the assembly is acting as a two-way valve in that fluid flows into one port and out of one other port. The purpose of a two-way valve is to shut of water flow or to allow (and regulate) flow through a pipe. In these configurations, one opening of the ball element is blind so that one of the three ports of the second valve element will be blocked by the body of the ball element so that the flow pattern is that of a two-way valve but various flow paths are possible depending on the rotational positions of the two elements relative to each other and relative to the manifold.

FIGS. 10A to 10D show example configurations of the assembly working as a three-way valve. Here, all three openings of the second valve element can be in alignment and fluid flow connection with ports of the ball element due to relative rotation of the two valve elements.

Figure 10A:
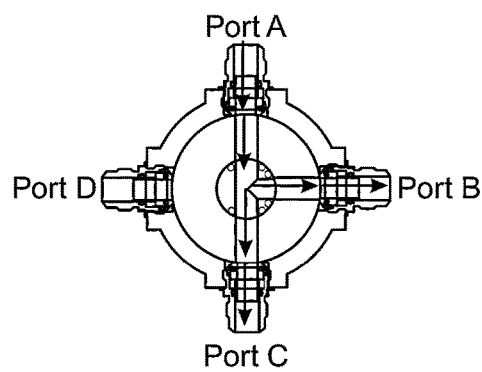
FIGS. 10A to 10D show possible positions of the assembly operating as a three-way valve.
Figure 10B:
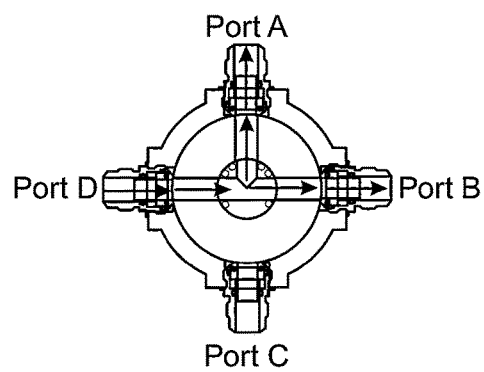
Figure 10C:
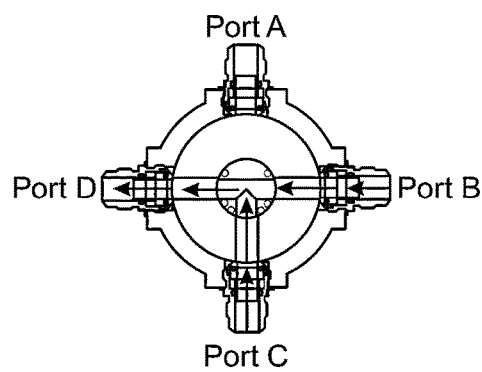
Figure 10D:
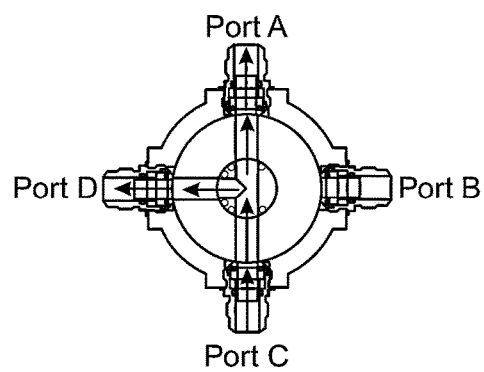

In FIG. 10A, the valve elements are arranged such that fluid flows into port A and out at ports B and C. In FIG. 10B, fluid flows in through port D and out through ports A and B. In the configuration of FIG. 10C, fluid flows in through port B and out from ports C and D. In the configuration of FIG. 10D, fluid flows into port C and out from ports A and D. In all of the examples shown, the assembly has one inlet and two outlets, but the assembly could, instead, have two inlets and one outlet, operating as a mixing assembly.

Control of the flow configuration of the valve assembly can be performed in two steps. In a first step, the two valve elements 14, 21 may be locked together by deactivating the solenoid (or by some other locking means) and the assembly is rotated e.g. by a dc motor (not shown) to align the ball element ports 40 with the appropriate manifold ports depending on the system lines to be connected to the valve. In some embodiments of the disclosure, only this step is performed—i.e. the relative positions of the two valve elements are set before installation and then the entire assembly is rotated together to align with the appropriate manifold ports.

As mentioned above, however, in some embodiments, after the assembly has been installed, the solenoid can be controlled to allow relative rotation of the second valve element to vary the configuration of the flow paths. Rotation of the valve elements, either together or individually may be controlled by a motor control unit (not shown) based on control from the positions of the microswitches.

Possible control algorithms for positioning the valve elements are described below with reference to FIGS. 11 to 14.

In the example shown, the first, outer ball, valve element 14 has three ports A, B, C for connection to fluid lines of the system with a fourth port being closed. The second, inner core, valve element 21 has three ports A', B', C'. Four possible valve positions are possible and are defined in the matrix of FIG. 11A and shown schematically in FIG. 11B. In position 1, port A' is aligned with port A, port B' is aligned with port B and port C is aligned with port C'. For desired position 2, the second valve element 21 is rotated anti-clockwise relative to the first valve element 14 by a quarter turn such that port B' is aligned with port A, and port C' is aligned with port B. Port A' is closed off. A further quarter turn in the anti-clockwise direction brings the valve assembly to position 3 in which port C' is aligned with port A and port A' is aligned with port C. Port B is closed off. A further quarter turn rotation of the second valve element brings the assembly into position 4 in which port A' is aligned with port B and port B' is aligned with port C. Port C' is closed off.

The valve assembly can be controlled to take up the desired configuration/position in different ways. One example of a valve control algorithm is described with reference to FIG. 12. In this example, the two valve elements 14,21 are set relative to each other as a first step and then the two elements are locked with respect to each other as described above and the combined valve assembly is rotated to the correct position. In more detail, the method involves reading a configuration command e.g. port A' aligned with port A, port B' aligned with port B and port C' aligned with port C. It is then, 102, determined whether the relative positions of the two valve elements is correct for the commanded configuration. If not, the second (inner) valve element 21 is rotated relative to the first (outer) valve element at step 104 until it is determined that the relative configuration of the valve elements is correct. Then, the position command for the entire valve assembly is read, 106, and it is determined, 108, whether the valve assembly is in the correct position (with respect to the manifold ports). If not, the entire valve assembly (i.e. the first and second valve elements together) is rotated relative to the manifold or housing to align with the correct system ports/lines.

In an alternative method, the valve assembly is installed and then controlled in situ. In one example, the algorithm can be implemented using simple logic whereby signals from position sensors indicating the positions of the two valve elements are compared with the connection matric. Such an algorithm is shown in FIG. 12. In step 200 the command is read from the port connection matrix (FIG. 11A). A rotation counter for the inner element 21 is set to 0, 210, and a determination is made as to whether the port connection is correct, 212, based on the position sensors. If not, the second (inner) valve member 21 is rotated by a quarter turn to its next position, 214 and the inner element rotation counter is increased to 1 and it is again checked, 212, whether the port correction is correct. If not, the inner valve element is further rotated and the counter is set to 2. Once the counter has reached 4—i.e. the inner valve element has been rotated to all four possible positions relative to the first, outer, valve element and the correct port connection has still not been achieved, then the first (outer) valve element is rotated to its next position, 218. The counter for the inner valve element 21 is reset to 0, 220, and up to four rotational positions for the inner valve element can be tried for the outer element in its new position. This continues until the correct connection configuration is obtained.

Figure 13:
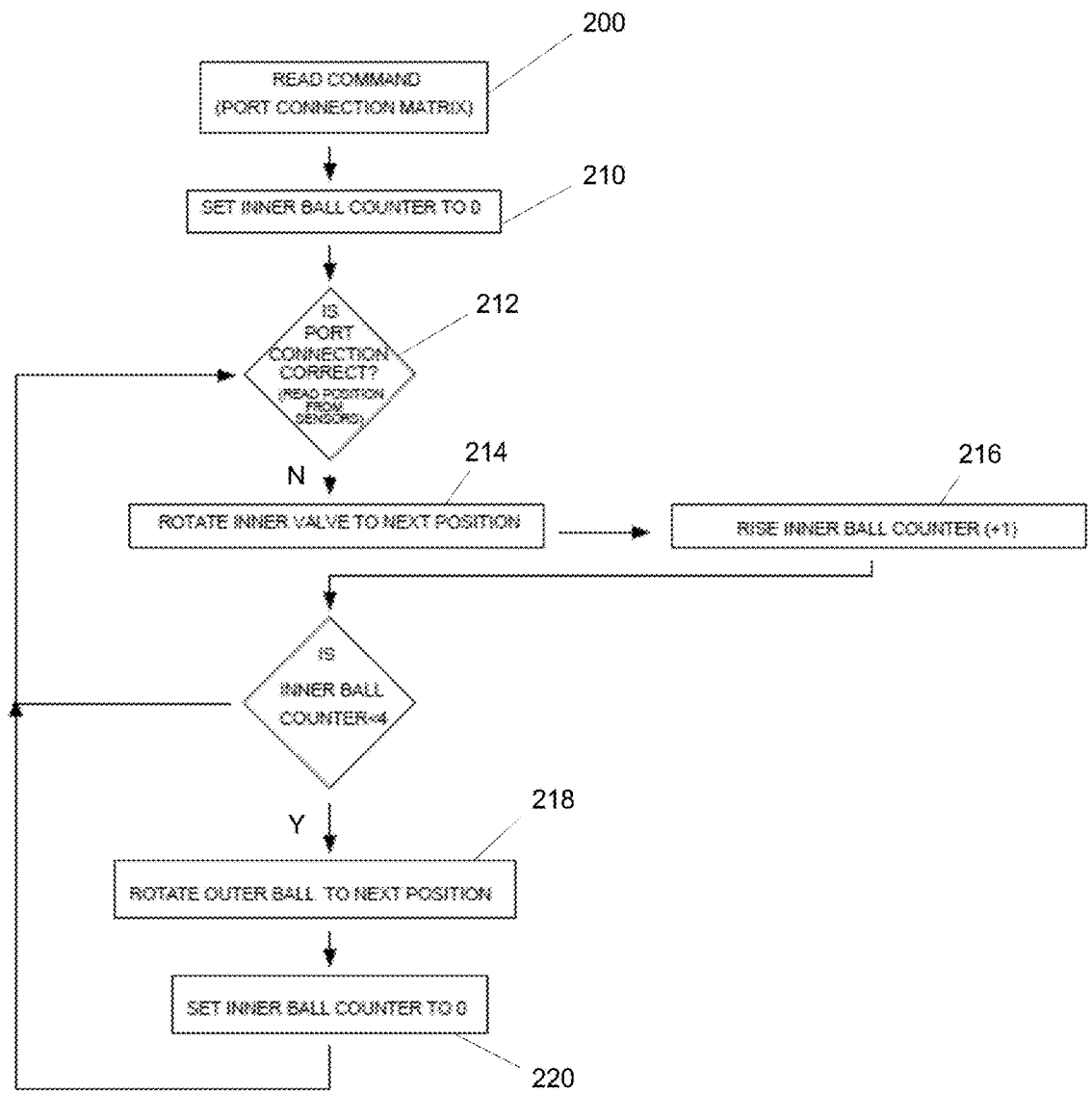
FIG. 13 is a flow chart of an alternative control method for the valve assembly.
Figure 14:
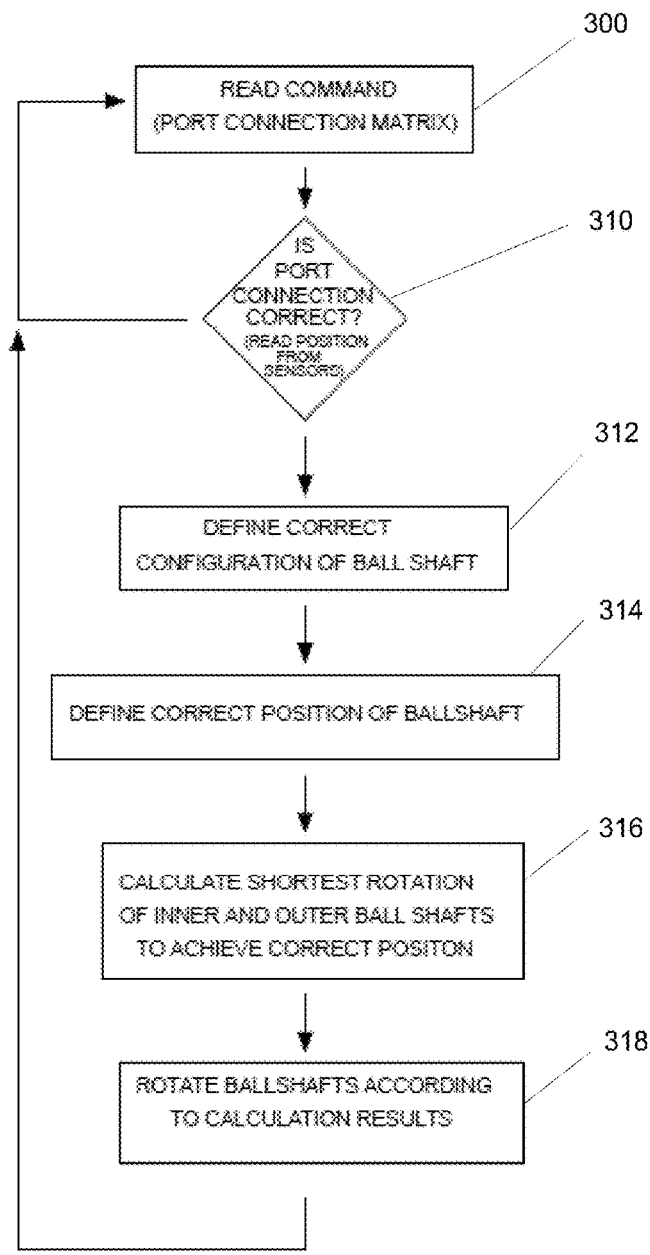
FIG. 14 is a flow chart of another alternative control method.

FIG. 14 shows an alternative algorithm, similar to that of FIG. 13, but which is implement using a valve motor control unit. Such a method can result in a quicker configuration of the valve assembly to the desired position. Here, as with the method of FIG. 13, first, 300, the command is read from the port connection matrix (FIG. 11A) and a determination is made at 310 as to whether the configuration of the assembly is correct. If not, the correct configuration is defined by the motor control unit, 312, and the correct position of the valve assembly relative to the system is defined at 314. The control unit calculates the shortest rotation of the first and second valve elements 14, 21 relative to each other and relative to the manifold to achieve the correct position, at 316. The valve elements and the assembly are then rotated accordingly, at 318.

It can be seen, therefore, that this assembly provides a two-way or a three-way valve, as required, from a single valve unit, with multiple flow path configurations. The design also means that if one port/pipe etc. fails, the valve can be reconfigured to use other operational ports/pipes etc.

Because of the multiple configurations, the valve could be used to connect multiple small water tanks rather than only a single larger tank. This may be useful where space is limited or where mass distribution is desirable, such as in aircraft water systems.

With the assembly of the disclosure, it is possible to achieve full shut-off even with a directional valve, which is not possible with conventional directional valves.

The compact and integral assembly design also minimises the water gaps in the assembly and thus limits the risk of water gathering in those gaps and freezing, or of debris accumulating.

The valve assembly design lends itself to additive manufacture which is simpler, quicker and less expensive and allows lighter components to be manufactured than in the case of conventional machining.

The invention claimed is:

1. A multi-way valve assembly comprising:
   a valve housing having a plurality of fluid ports;
   a first valve member having one or more first flow channels defined therethrough and a first shaft, rotation of which causes rotation of the first valve member relative to the housing, the first valve member defining a cavity;
   a second valve member arranged within the cavity of the first valve member and having one or more second flow channels defined therethrough and a second shaft, rotation of which causes rotation of the second valve member relative to the housing; and
   a locking mechanism configured to, in a locked position, cause the second valve member to rotate with the first valve member relative to the housing and, in an unlocked position, to permit the second valve member to rotate relative to the first valve member and the housing.

2. The assembly of claim 1, wherein the first valve member comprises a ball element and the second valve member comprises a core element located within the ball element.

3. The assembly of claim 2, wherein the cavity is provided with a cover from which the first shaft extends.

4. The assembly of claim 1, wherein the first shaft is a hollow shaft and the second shaft extends through the first shaft.

5. The assembly of claim 1, further comprising:
   a first set of microswitches arranged to detect the rotational position of the first shaft; and
   a second set of microswitches arranged to detect the rotational position of the second shaft.

6. The assembly of claim 5, wherein the first set of microswitches is arranged on a first platform within the housing at a first axial position and the second set of microswitches is arranged on a second platform within the housing at a second axial position.

7. The assembly of claim 1, wherein the first valve member comprises two flow channels each defined between a respective inlet port and outlet port formed in the valve member.

8. The assembly of claim 1, wherein the second valve member includes a T-shaped fluid channel defined between three ports in the valve member.

9. The assembly of claim 1, wherein the locking mechanism comprises a compression spring and a pressing disk compressed between the second valve member and the housing, and a drive to move the pressing disk with respect to the compression spring.

10. The assembly of claim 9, wherein the drive comprises a solenoid; and
   wherein activation of the solenoid the pressing disk is not in contact with the second valve member and the second valve member is able to rotate relative to the first valve member, and when the solenoid is deactivated, the pressing disk presses the second valve member into engagement with the first valve member such that rotation of the first valve member causes rotation of the second valve member.

11. A fluid flow system comprising:
   one or fluid flow lines; and
   a valve assembly as claimed in claim 1, located within one or more fluid flow lines.

12. A water system comprising:
   a water tank and a water supply; and
   a fluid flow system as claimed in claim 11 providing flow lines between the tank and the supply.

13. The water system of claim 12, being an aircraft water system.

* * * * *